US012699806B1

(12) United States Patent (10) Patent No.: US 12,699,806 B1
Vyas et al. (45) Date of Patent: Aug. 4, 2026

(54) SELECTIVE ARTIFICIAL INTELLIGENCE PROCESSING OF SENSITIVE DATA

(71) Applicant: Capital One Services, LLC, McLean, VA (US)

(72) Inventors: Keyurkumar Vyas, Suwanee, GA (US); Lan Xie, Chantilly, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/454,972

(22) Filed: Jan. 21, 2026

Related U.S. Application Data

(63) Continuation of application No. 19/379,107, filed on Nov. 4, 2025.

(51) Int. Cl.
| | |
|---|---|
| *G06F 21/62* | (2013.01) |
| *G06F 21/60* | (2013.01) |
| *G06N 20/00* | (2019.01) |

(52) U.S. Cl.
CPC ........ *G06F 21/6245* (2013.01); *G06F 21/602* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,057,237 | B2 * | 8/2018 | Arnady | H04L 63/0807 |
| 11,816,116 | B2 * | 11/2023 | Sankaran | G06F 16/2468 |
| 2022/0114285 | A1 * | 4/2022 | Biernacki | H04L 9/003 |
| 2025/0021844 | A1 * | 1/2025 | Zalmanson | G06N 5/046 |
| 2025/0200086 | A1 * | 6/2025 | Malboubi | G06F 40/40 |
| 2025/0232057 | A1 * | 7/2025 | Le Berre | G06F 21/602 |
| 2025/0363231 | A1 * | 11/2025 | Bhatt | G06F 21/6218 |

* cited by examiner

*Primary Examiner* — Raqiul A Choudhury
(74) *Attorney, Agent, or Firm* — Banner & Witcoff, Ltd.

(57) ABSTRACT

Methods, systems, and apparatuses are described herein for efficiently identifying and processing sensitive data. A computing device may receive text content, such as one or more words. The computing device may select characters of that text content by identifying, using regular expressions corresponding to sensitive data categories, matches and select various characters including and around such matches. The computing device may provide the selected characters as input to a machine learning model trained to identify sensitive data, and that trained machine learning model may output information about a sensitivity of the characters. Such output might be used to modify all or portions of the text content.

20 Claims, 6 Drawing Sheets

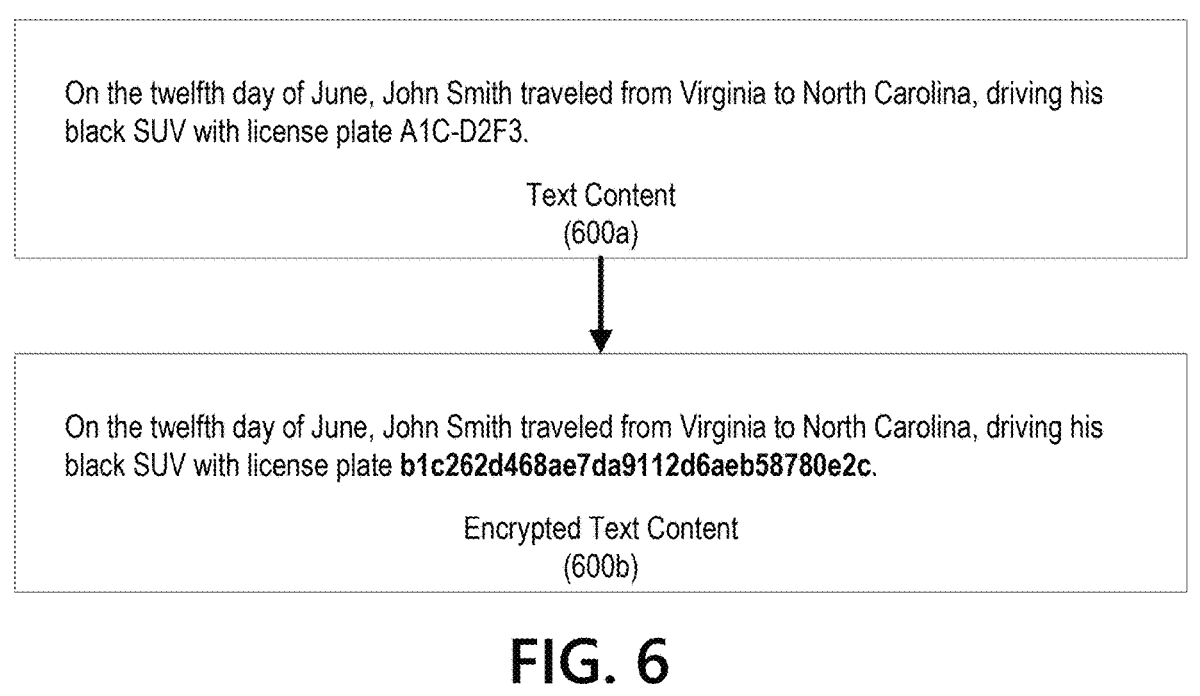

On the twelfth day of June, John Smith traveled from Virginia to North Carolina, driving his black SUV with license plate A1C-D2F3.

Text Content
(600a)

On the twelfth day of June, John Smith traveled from Virginia to North Carolina, driving his black SUV with license plate b1c262d468ae7da9112d6aeb58780e2c.

Encrypted Text Content
(600b)

FIG. 6

SELECTIVE ARTIFICIAL INTELLIGENCE PROCESSING OF SENSITIVE DATA

CROSS REFERENCE TO RELATED APPLICATIONS

This application is a continuation of U.S. application Ser. No. 19/379,107, entitled "Selective Artificial Intelligence Processing of Sensitive Data" and filed Nov. 4, 2025. The contents of the above listed application is expressly incorporated herein by reference in its entirety for any and all non-limiting purposes.

FIELD OF USE

Aspects of the disclosure relate generally to data storage, data transmission, and data processing. More specifically, aspects of the disclosure may provide for a system that can selectively use a variety of available processes, including machine learning models trained via artificial neural networks, for data security processing and protection.

BACKGROUND

An increasing amount of sensitive data is digitally received, processed, and stored in a variety of contexts. For example, healthcare providers routinely receive, process, and store sensitive healthcare information using a variety of servers, and such sensitive data might be transmitted and displayed in a variety of contexts (e.g., for a healthcare provider in a clinical setting, as part of a website displayed to a patient, or the like). Organizations often receive and process such sensitive information in a variety of contexts: as part of processing of a written or digital form (e.g., such as a patient intake form), as embedded in existing information (e.g., as might be inadvertently included in some long-form paragraph, such as a healthcare provider's notes), or the like. In turn, there is a substantial risk that sensitive information might be included in a variety of different types of data and data formats, even when adequate precautions are otherwise taken.

Worse still, data processing to identify sensitive data can be undesirably slow, cumbersome, inaccurate, and imprecise. For instance, presently commercially-available data protection systems may purport to provide sensitive data identification and anonymization functionalities, but these approaches can be surprisingly slow (particularly in fast-moving data environments) and cumbersome (e.g., because they do not support flow-level analysis and modification of data, meaning that data must be broken up and iteratively processed). Moreover, systems that purport to provide quick sensitive data identification processes are not as quick as they might seem: many require that data be provided in a particular format, meaning that they can fail to work properly for certain forms of structured data (or, worse yet, can require significant pre-processing of data to work at all, introducing significant latency into the detection process). Further still, such systems are often not particularly accurate or precise, especially when presented with certain types of input (e.g., input in unexpected data formats). For example, many data protection systems expect data to be in a specific (e.g., idiosyncratic) format, meaning that unusually-formatted data can confuse those systems, potentially allowing secure data to slip past the system undetected.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to a solution for quickly and dynamically processing (e.g., masking) a wide variety of sensitive information within text data. As will be described in great detail below, this process may entail the selective use of a variety of different processing mechanisms, such as one or more different machine learning models, implemented via artificial neural networks and using natural language processing techniques, configured to identify sensitive information within a wide range of textual content. The approaches described herein use a unique, context-sensitive flow that has been shown in testing to be both faster and significantly more accurate than existing sensitive detection systems. In turn, the approaches described herein can be used to quickly and efficiently detect sensitive data within a wide variety of textual content, mask (e.g., anonymize, remove, tokenize, redact) that sensitive information, and unmask (e.g., de-anonymize, re-add, de-tokenize, replace) that sensitive information as desired. The process described herein is also designed to be highly flexible and adaptable to a wide variety of data structures, avoiding many of the structure-based limitations of conventional sensitivity processing systems.

As one example of how the processes described herein may operate, a computing device may receive, from a second computing device, first text content. The computing device may then select a plurality of characters of that first text content using a variety of steps. For instance, the computing device may identify, by testing the first text content using a plurality of different regular expressions corresponding to a plurality of sensitive data categories, a first match between one or more characters of the plurality of characters of the first text content and a first regular expression, of the plurality of different regular expressions, corresponding to a first sensitive data category. That first match might be further based on, for example, an identification, in the first text content, of one or more words associated with the first sensitive data category. Once that first match is identified, the computing device might then select, from the first text content and based on the first match, a first predetermined quantity of characters including the one or more characters of the plurality of characters of the first text content. The computing device may then provide, as input to a first trained machine learning model, the plurality of characters of the first text content. That first trained machine learning model may have been trained, using first training data, to identify sensitive data of the first sensitive data category, with that first training data comprising a first plurality of text sets tagged with indications of the sensitive data of the first sensitive data category. The computing device may then modify, based on output from the first trained machine learning model indicating that the plurality of characters of the first text content comprise the sensitive data of the first sensitive data category, and based on a location of the one or more characters of the plurality of characters of the first text content, at least a portion of the plurality of characters of the first text content. Later, the computing device may receive, from the second computing device, second text content. In that circumstance, the computing device may provide, based on an absence of a second match between a plurality of characters of the second text content and the plurality of different regular expressions, and to a second trained machine learning model, the plurality of characters of the second text content. That second trained machine learning model may have been trained, using second training data, to identify sensitive data corresponding to the plurality of sensitive data categories. The computing device may then cause, based on output from the second trained machine learning model, display of a user interface indicating a likelihood that the second text content corresponds to at least one of the plurality of sensitive data categories.

One of the many advantages of the process described herein is that different processing approaches (e.g., different machine learning models) might be implemented for different received text. For example, the computing device may identify the first trained machine learning model from a plurality of trained machine learning models based on one or more of an identity of an origin of the first text content and/or a sensitivity level corresponding to the first sensitive data category. This may mean that different text is processed using radically different approaches: some might be processed using machine learning techniques, others might be processed using natural language processing algorithm(s), some might be processed by third-parties, and the like. For example, the computing device may receive, from the second computing device, third text content, identify, by testing the third text content using the plurality of different regular expressions corresponding to the plurality of sensitive data categories, a third match between one or more characters of a plurality of characters of the third text content and a second regular expression, of the plurality of different regular expressions, corresponding to a second sensitive data category, and then may process, based on the third match, the third text content using an algorithm using, for example, a natural language processing algorithm and/or a third-party text processing algorithm. As another example, the computing device may receive, from the second computing device, third text content and may identify, by testing the third text content using the plurality of different regular expressions corresponding to the plurality of sensitive data categories, a third match between one or more characters of a plurality of characters of the third text content and a second regular expression, of the plurality of different regular expressions, corresponding to a second sensitive data category. In that example, the computing device may provide, as input to a third trained machine learning model, the plurality of characters of the third text content. That third trained machine learning model may comprise a third artificial neural network trained, using third training data, to identify sensitive data of the second sensitive data category, with the third training data comprising a second plurality of text sets tagged with indications of the sensitive data of the second sensitive data category. In that example, the computing device may modify, based on output from the third trained machine learning model indicating that the plurality of characters of the third text content comprise the sensitive data of the second sensitive data category, at least a portion of the plurality of characters of the third text content.

The process described herein may also advantageously implement different processes (e.g., different machine learning models, different algorithms) based on their accuracy in various circumstances (e.g., for different types of data, for different sensitive data categories). For example, the computing device may identify the first trained machine learning model from a plurality of trained machine learning models based on an accuracy of the first trained machine learning model. That accuracy may have been calculated based on testing the first trained machine learning model using a testing data set comprising a plurality of tagged data entries corresponding to the first sensitive data category.

The modification of sensitive data identified in text content may be performed in a variety of ways. For instance, the computing device may modify the at least a portion of the plurality of characters of the first text content by encrypting the at least a portion of the plurality of characters of the first text content and/or tokenizing at least a portion of the plurality of characters of the first text content.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 depicts text content and encrypted text content.

DETAILED DESCRIPTION

Figure 1:
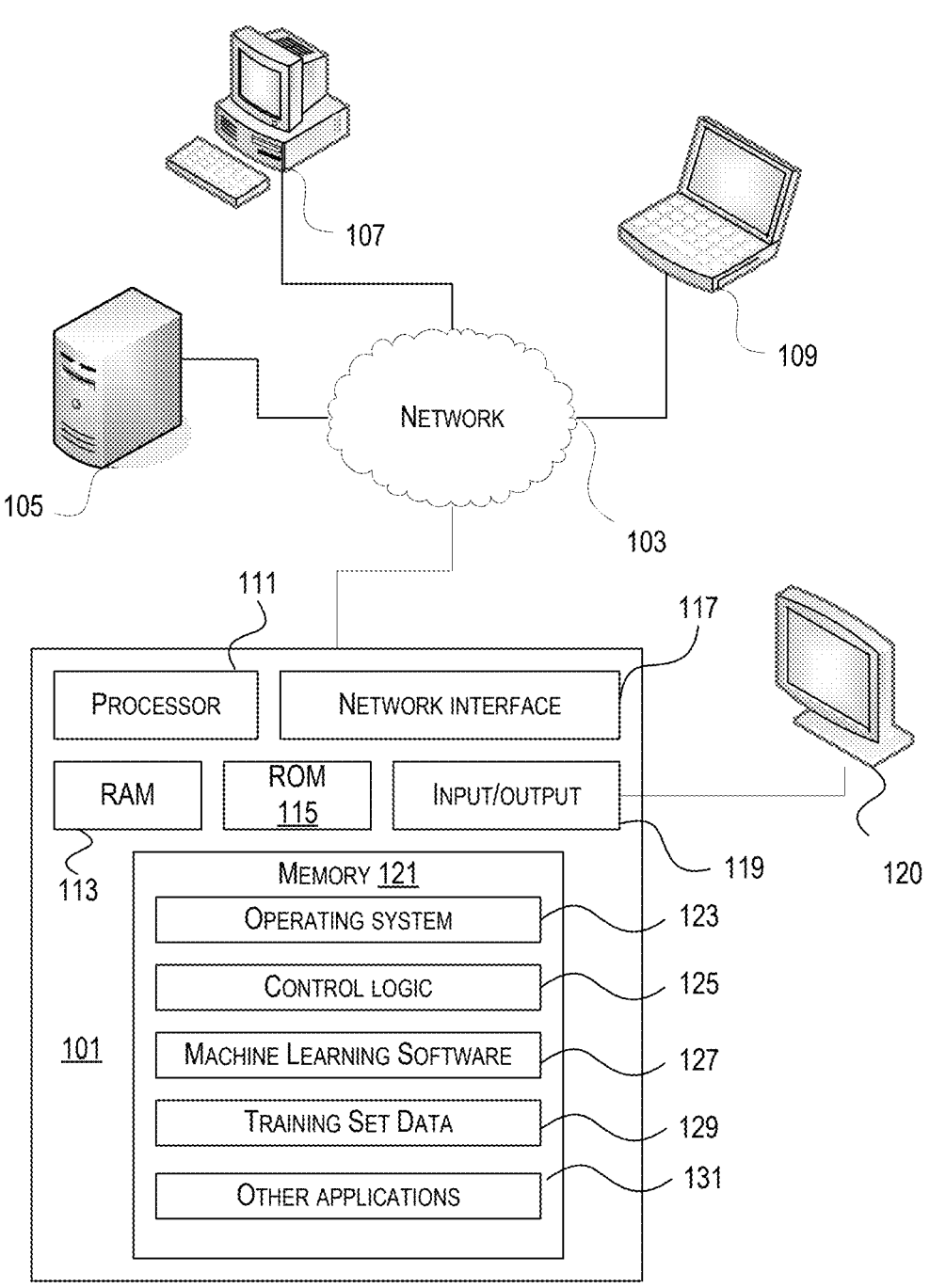
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, sensitive data may be received by an organization in a variety of ways. While such data might be ideally received in a way that cautions of its existence (e.g., sensitive data such as a home address might be located on a nicely-labeled "home address" field in a column of a table), practically speaking this is not always the case. In fact, it is very common that sensitive data is buried in unstructured and/or structured data, whether deeply located within a paragraph of plain text, mislabeled as part of the wrong column in tabular data, or the like. This problem often means that organizations expend substantial amounts of time and money trying to find such sensitive data. Worse yet, the processes currently available for identifying and processing sensitive data are ill-suited for this task: many are undesirably slow (e.g., take an undesirable amount of time to process text), imprecise (e.g., have a high false positive rate and/or false negative rate), and/or ill-suited for the fast flow of data (e.g., some algorithms might require that data be pre-formatted, adding substantial processing effort and time).

Aspects described herein remedy these and other issues by implementing a fast and efficient text processing system capable of receiving text content, identifying sensitive data in that text content, processing the text content based on the presence of any such sensitive data, and reversing that process (e.g., de-tokenizing portions of data, replacing removed portions of data) as necessary. As will be detailed further below, this process may involve a preliminary filtering step using techniques such as regular expressions to identify one or more portions of text content that might comprise sensitive data. Then, corresponding portions of text content (including, for example, both the potentially sensitive content and surrounding characters/words) might be processed using machine learning techniques to identify a likelihood that the content is, in fact, sensitive. Such machine learning models might be specific to different types of sensitive data such that, for example, one machine learning model might be specific to identifying license plate data, another machine learning model might be specific to identifying social security numbers, and the like. The identified sensitive data might be then processed (e.g., encrypted, removed, tokenized) as desired, and that processing might be reversed (e.g., via de-encryption, addition, de-tokenization) upon request. This process may thereby provide quick, efficient, sensitive data category-specific, and—as necessary—format-agnostic processing of text data to quickly identify and protect sensitive data, even when that data is received extremely quickly (e.g., as part of a fast-moving flow of data, as part of a large dump of data).

To provide a simple example of how aspects described herein may work, a data processing device may receive, from a user device, a first paragraph of text. Buried deep within that paragraph of text might be a phone number, which might be treated as one category of sensitive data. The data processing device might first categorize the paragraph (e.g., based on the fact it was received from a specific user, via a specific application or source, or the like) and then may execute a variety of regular expressions against the text paragraph. Those regular expressions may comprise one or more regular expressions configured to identify phone numbers in text (e.g., three numbers, then a dash, then three numbers, then a dash, then four numbers, which may vary depending on the country of interest). Based on one of those regular expressions identifying a phone number in text, the data processing device may identify a plurality of characters around and including the phone number (e.g., the string " . . . contact me at my number 123-456-7890 and I will call . . .") and may provide that plurality of characters as input to a particular machine learning model (e.g., a machine learning model specifically trained to identify sensitive phone numbers). That machine learning model might then output an indication of a likelihood that the number is, in fact, a phone number. This approach means that false positives from the regular expression (e.g., the identification of a phone number in the phrase "Our tracking number for this shipment is 1234567890") might be corrected using the finer-detail processing of the trained machine learning model. And, this process might be repeated for a wide variety of different types of sensitive data in the same paragraph, and different types of such sensitive data might be identified using different regular expressions and processed using different approaches (e.g., different machine learning models, different natural language processing tools, different third-party algorithms). This process may thereby receive text content in a wide variety of formats (e.g., unstructured data, structured data) and quickly and efficiently process it using best-available, sensitive-content-specific approaches in a way that results in highly accurate and high-speed identification and classification of sensitive data.

Aspects described herein improve the functioning of computers by providing a comprehensive process for improving the receipt, processing, and storage of sensitive data in a system. The approaches described herein relate to a unique issue to computing devices: the importance of receiving, processing, and storing sensitive data, particularly in circumstances when such data is received at a high speed (as is the case for large networks) and where such data is in a variety of formats. The approaches described herein are fundamentally reliant on computing processes such as regular expressions and machine learning, among other processes, to remediate those and other issues. This is, in turn, a computer-implemented improvement to a computer-specific problem for which there is no human analogue.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) C++. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Devices, such as devices 101, 105, 107, and/or 109, may additionally or alternatively comprise a hardware security module 135. For simplicity of explanation for the purposes of FIG. 1, the hardware security module 135 is shown as part of a device; however, the hardware security module 135 may be external to the devices (and, e.g., some module on a network). The hardware security module 135 may be configured to store one or more encryption algorithms, one or more keys (e.g., key encryption keys, data encryption keys), one or more passwords, or the like. The hardware security module 135 may be wholly or partially separated from other aspects of a computing device. For example, the hardware security module 135 may be accessible only in accordance with specific Application Programming Interfaces (APIs), via only specific programs, or the like. In this manner, the hardware security module 135 may be configured to securely manage processes such as encryption and decryption.

Figure 2:
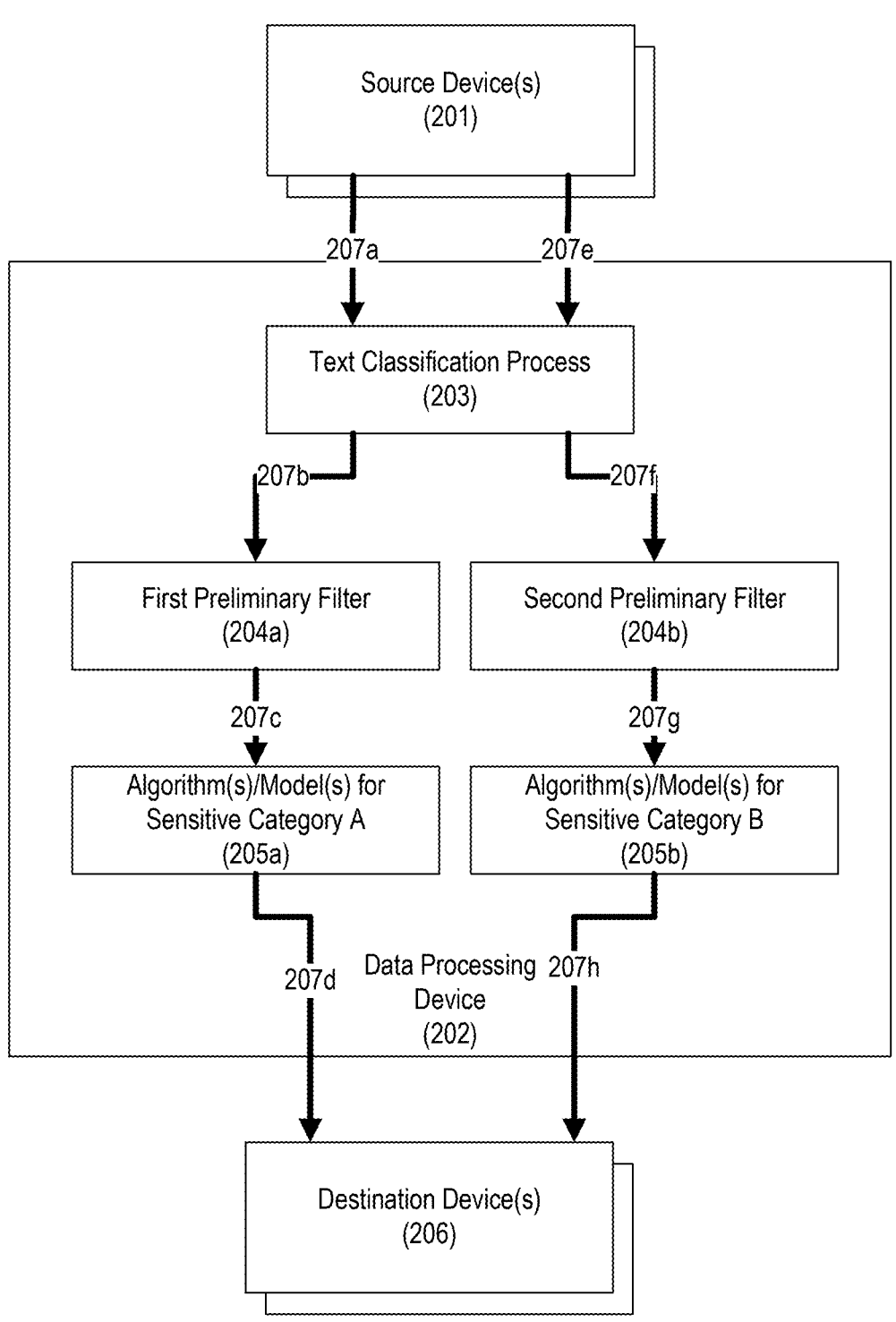
FIG. 2 depicts a system comprising a data processing device.

FIG. 2 depicts an example of a system comprising a data processing device 202, one or more source devices 201, and one or more destination devices 206. The devices depicted in FIG. 2 are illustrative, and may be re-arranged and/or otherwise re-configured as desired. For example, the one or more source devices 201 and/or the one or more destination devices 206 may comprise user devices such as smartphones, laptops, and/or the like, such that the process depicted in FIG. 2 may relate to protecting data being transmitted from one user device to another. As another example, the data processing device 202 and the one or more destination devices 206 may be part of the same computing device (e.g., the same server), such that the distinction between those elements might be logical, but not necessarily physical. Any of these devices may be the same or similar as the devices described with respect to FIG. 1, including but not limited to the device 101, the device 105, the device 107, and/or the device 109.

The one or more source devices 201 may be any devices that provide text content. Such text content may comprise one or more characters, such as might be formatted into one or more words, sentences, paragraphs, or the like. The text content might be unstructured or structured, or some combination thereof: for example, the text content might be all or portions of tabular data and/or might be provided as an unstructured stream of text content. Text content provided to the data processing device 202 by the one or more source devices 201 may be associated with metadata identifying, for example, an origin of the text content (e.g., from a particular application, from a particular database, from a particular research study), an identity of a particular source device (e.g., a unique device identifier, an Internet Protocol (IP) address), an identity of a particular user (e.g., a user of the source device, a user associated with collection of the text content), or the like. One of the many advantages of the process described herein is that the one or more source devices 201 may vary significantly: they need not provide the text data in a particular structured format, need not originate from a consistent source, or the like.

The data processing device 202 may comprise one or more computing devices configured to identify and process sensitive data in text content. For example, the data processing device 202 may be configured to receive text content from the one or more source devices 201, classify it into one of a variety of categories, filter it using techniques such as regular expressions to identify portions of the text content that potentially correspond to sensitive data, process those identified portions of the text data using techniques such as machine learning to identify sensitive data, and modify that sensitive data as desired (e.g., through encryption, tokenization, removal of portions of data, or similar techniques). For the purposes of illustration, FIG. 2 depicts the data processing device 202 as comprising a text classification process 203, and then two data processing pipelines: one pipeline comprising a first preliminary filter 204a and one or more algorithms or models for sensitive category A 205a, and another pipeline comprising a second preliminary filter 204b and one or more algorithms or models for sensitive category B 205b. These elements reflect the idea that the data processing device 202 might first categorize received text content (e.g., based on its origin, based on whether it is structured or unstructured, or the like) to identify which preliminary filters (e.g., which regular expression rules and/or other preliminary processing tasks) it should perform, and then ultimately use the output of those preliminary filters to identify which model(s) and/or algorithm(s) should be used to confirm the presence of sensitive data. For example, the data processing device 202 might maintain (as the first preliminary filter 204*a*) one set of regular expressions for data from one source (e.g., web forms) and might maintain (as second preliminary filter 204*b*) another set of regular expressions for a different source (e.g., Optical Character Recognition (OCR)-based text generated from scanned documents). With that said, multiple preliminary filters need not always be present, and in some circumstances the same or similar preliminary filters might be implemented. Regardless, the output of such preliminary filter(s) might be used to identify input data for particular machine learning model(s), algorithms, or similar processing techniques to confirm the presence of sensitive data. As will be detailed further below, one of the many advantages of this present implementation is that the match between some portion of text content and (for example) a regular expression may be used as a starting point for input to such algorithms/models: for example, the input might comprise the particular string match as well as one or more characters surrounding the string match, such that the algorithm(s)/ model(s) are provided additional context about the potentially sensitive data.

As indicated by the above, the data processing device 202 may be configured to perform preliminary filtering steps. Such preliminary filtering steps may comprise, for example, application of one or more regular expressions, data processing rules, and/or other algorithms to identify portion(s) of text content that might correspond to sensitive data. For instance, a regular expression rule may be configured to identify phone numbers in a format such as by identifying a series of at least ten numbers that may be (but need not be) separated by spaces or dashes. As another example, a data processing rule may specify that, for structured data, any column named "SSN" or "Social Security Number" is presumptively assumed to contain sensitive data. As yet another example, an algorithm implemented as part of a preliminary filter may specify that any data received from a particular source (e.g., a database associated with user personal details, a form used to collect purchase information) or from a particular application (e.g., a health tracking application, a banking application) is presumptively assumed to contain sensitive data in particular locations (e.g., in particular rows of a table, in a particular part of a paragraph).

The data processing device 202 may also be configured to execute one or more models (e.g., machine learning models) and/or implement one or more algorithms for processing portion(s) of text data to identify whether those portions correspond to (e.g., comprise, contain) sensitive data. For example, as part of the filtering described above, a particular sentence of a paragraph might be identified as potentially containing a bank account number. In that circumstance, the data processing device 202 may provide all or portions of the sentence (including but not limited to the bank account number and surrounding words/characters) as input to a machine learning model, which might provide output indicating (for example) a confidence that all or portions of the input correspond to sensitive data, one or more categories of sensitive data to which the input might correspond, a location (e.g., in terms of a range of characters) of the likely sensitive data, or the like.

The data processing device 202 may be configured to process text content by, for example, encrypting, tokenizing, obfuscating, and/or otherwise modifying portions of the text content. For example, a portion of the text content identified as being related to and/or containing sensitive data may be encrypted using an encryption algorithm. The data processing device 202 may perform this process using one-way algorithms (e.g., one-way encryption and/or hashing algorithms that are generally designed to be irreversible and/or an algorithm configured to delete sensitive data without preserving that data) and/or using two-way algorithms (e.g., tokenization and/or encryption algorithms configured to be reversed using, for example, a particular key). The particular form of processing might depend on the type of sensitive data identified: for instance, certain types of data (e.g., phone numbers and addresses) might be tokenized so that they can be later retrieved when appropriate, whereas other types of data (e.g., medical histories, passwords) might be completely deleted or encrypted using a one-way encryption algorithm. The particular form of processing might also depend on the recipient: for example, certain categories of sensitive data might be preserved based on a security level of a particular destination device satisfying a threshold corresponding to those categories of sensitive data.

The one or more destination devices 206 may be configured to receive processed forms of data from the data processing device 202. For example, the one or more destination devices 206 may receive a form of the text content that has one or more portions of sensitive data removed, encrypted, tokenized, and/or otherwise modified. The one or more destination devices 206 may, in the case where the data is processed in a reversible manner, request the reversing of such processing (e.g., request the real version of tokenized data, request the appropriate key(s) for de-encryption in view of use of a particular encryption algorithm to encrypt sensitive data). To be approved for such reversal, the data processing device 202 may authenticate the one or more destination devices 206 using, for example, authentication credentials. For example, the one or more destination devices 206 might be provided a de-tokenized form of tokenized data of a particular sensitive data category only upon providing sufficient authentication credentials that correspond to a security authorization level that satisfies a threshold corresponding to that sensitive data category.

Figure 3:
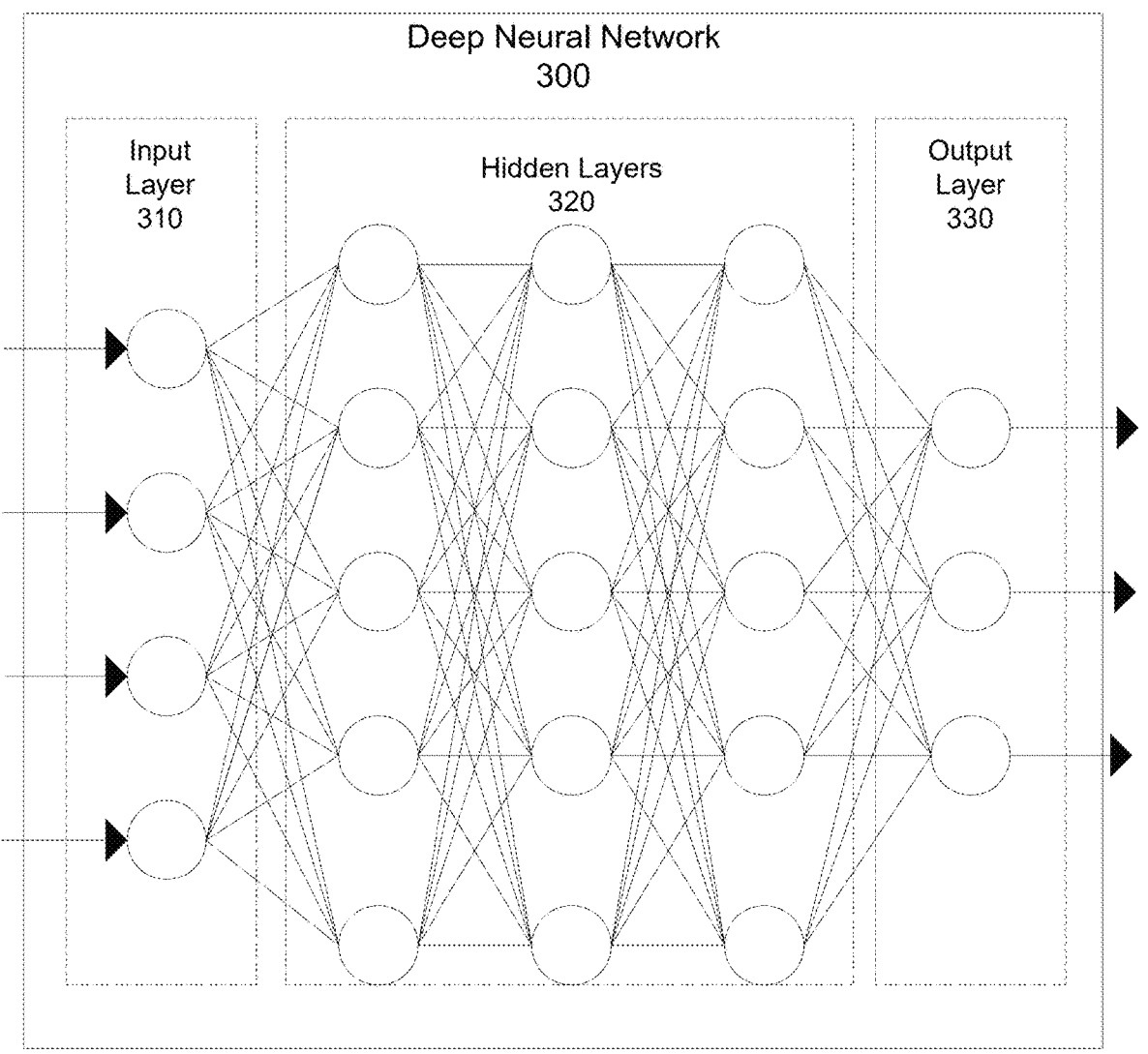
FIG. 3 depicts an artificial neural network that might be used to implement a machine learning model.

FIG. 3 illustrates an example of a deep neural network architecture 300. Such a deep neural network architecture may be all or portions of the machine learning software 127 shown in FIG. 1. That said, the architecture depicted in FIG. 3 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 310, one or more hidden layers 320, and an output layer 330. A deep neural network, as used herein, may be an artificial network that has more than one hidden layer. Illustrated network architecture 300 is depicted with three hidden layers, and thus may be considered a deep neural network. The number of hidden layers employed in deep neural network architecture 300 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Training an artificial neural network, like the deep neural network architecture 300 depicted in FIG. 3, might generate a trained machine learning model. The trained machine learning model may comprise a generative AI model or a large language model (LLM). The trained machine learning model may be a publicly-available generative AI model, such as ChatGPT, Bard, M365 Copilot, Scribe, Jasper, etc. The trained machine learning model may be trained using supervised learning, unsupervised learning, backpropagation, transfer learning, stochastic gradient descent, learning rate decay, dropout, max pooling, batch normalization, long short-term memory, skip-gram, or any equivalent deep learning technique.

The training data used to train an artificial neural network and generate a trained machine learning model may comprise structured and/or unstructured data, and may be tagged and/or untagged. Examples of data that might be included in the training data may include various portions of text content tagged with indications of particular categories of sensitive data. That data might have been generated based on previous data processing tasks, such as past encryption, tokenization, and/or anonymization processes performed manually and/or via one or more other algorithms. In turn, such training data might be used to train the machine learning model to, when provided input data, output an indication of whether such input data (e.g., reflecting some portion of text content, such as a sentence of that text content) comprises one or more portions of sensitive data. In certain circumstances, the output might additionally indicate the location of such purported sensitive data, such as an identification of a range of characters and/or particular word or words that comprise the sensitive data. The output need not indicate a singular category of sensitive data: for instance, the output might comprise a plurality of candidate categories of sensitive data for a particular range of characters/words, with different confidence values assigned to each of the plurality of candidate categories.

Figure 4:
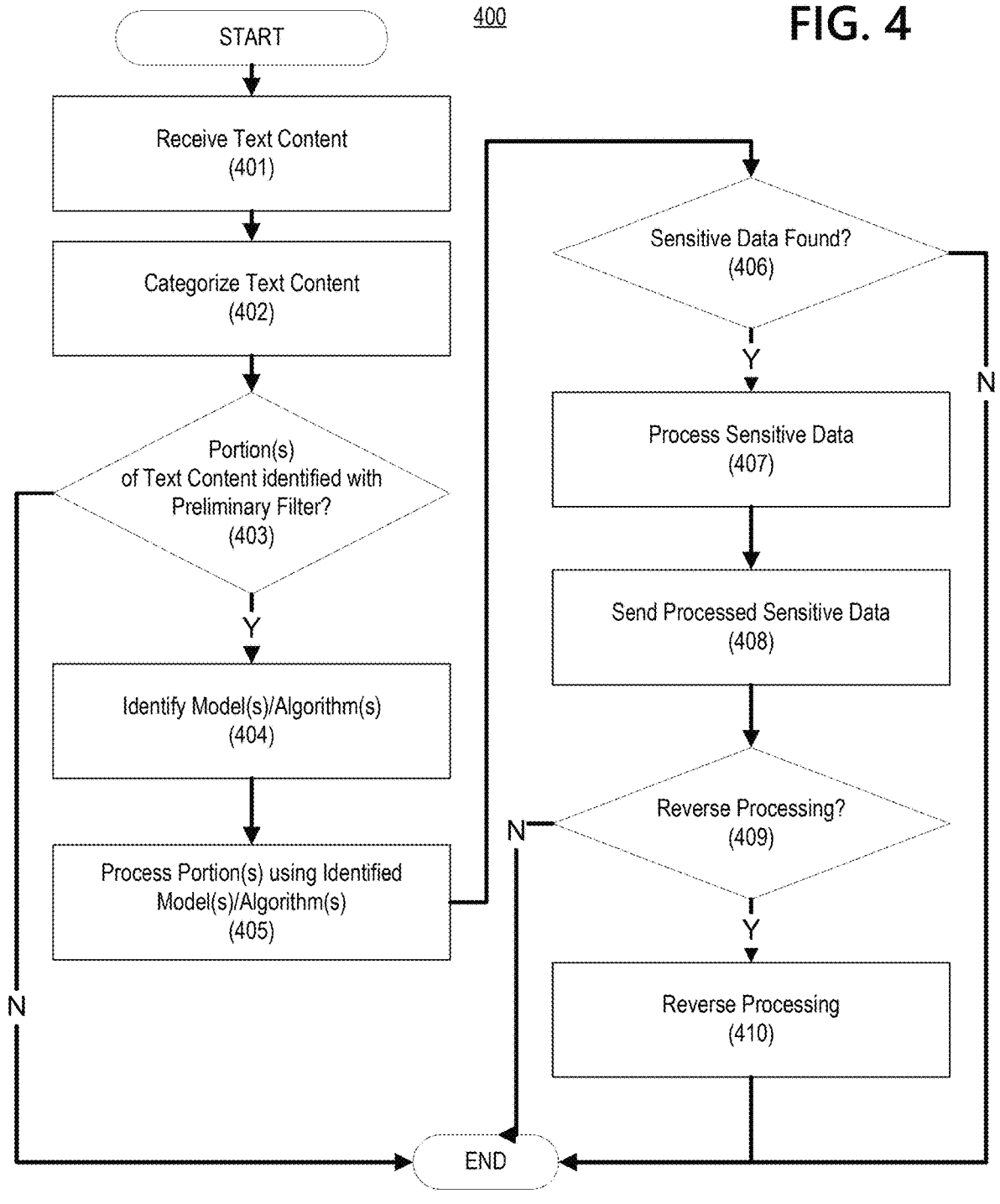
FIG. 4 depicts a flow chart comprising steps which may be performed to efficiently identify and process sensitive data.

FIG. 4 depicts a flow chart depicting a method 400 comprising steps which may be performed by a computing device, such as any of the devices depicted in FIG. 2, for efficiently identifying and processing sensitive data. One or more computing devices may comprise one or more processors and memory storing instructions that, when executed by the one or more processors, cause performance of one or more of the steps of FIG. 4. One or more non-transitory computer-readable media may store instructions that, when executed by one or more processors of a computing device, cause the computing device to perform one or more of the steps of FIG. 4. Additionally and/or alternatively, one or more of the devices depicted in FIG. 2, such as the data processing device 202, may be configured to perform one or more of the steps of FIG. 4. For simplicity, the steps below will be described as being performed by a single computing device; however, this is merely for simplicity, and any of the below-referenced steps may be performed by a wide variety of computing devices, including multiple computing devices.

In step 401, a computing device may receive text content. Text content may be any collection of textual data, such as one or more characters, words, sentences, paragraphs, or the like. The text content may be received via one or more different computing devices, such as the one or more source devices 201 of FIG. 2. For example, the computing device may receive, from a second computing device, first text content. The text content may be associated with metadata, which may specify information such as a source of the text content (e.g., where the text data was received, such as a particular form, a particular database, or a particular document), how the text content was collected (e.g., OCR, through a web form, through scraping of a web page), categories of the text content (e.g., blog data, medical data, forum posts, financial transaction data), tables and/or rows of the text content (e.g., in circumstances where the text content is in a structured format, such as in a tabular or marked-up format), or the like.

In step 402, the computing device may categorize the text content. Categorizing the text content might be based on an origin of the text content, a user that provided and/or collected the text content, an application used to process the text content, a format of the text content, or the like. In turn, the categorization of the text content may be based on metadata of the text content, particularly when that metadata comprises information (e.g., categorization information) that can be used to categorize the text content. Additionally and/or alternatively, the computing device may process the text content to categorize it. For instance, the computing device may compare all or portions of the text content to one or more templates or standards to identify a most likely category of the text content. As another example, the computing device may determine a category of the text content by identifying one or more keywords (e.g., "blog post," "medical," "payment") in the text content.

One reason that the text content may be categorized is to identify a corresponding preliminary filter for processing of the text content. For example, the computing device may maintain one set of regular expressions for processing financial data and a different set of regular expressions for processing medical data. That said, the process reflected in step 402 may be optional in some implementations. For instance, where a single preliminary filter is implemented, then it might be unnecessary to categorize the text content. In such a circumstance, different machine learning model(s) and/or algorithm(s) might be used later, but a singular set of preliminary filtering steps might be taken regardless of text category (or, e.g., based on the knowledge that all received text content will be the same category).

In step 403, the computing device may determine whether it has identified, using a preliminary filter (e.g., one or more regular expressions, algorithms, or the like), portion(s) of text content that might relate to sensitive data. If the preliminary filter suggests that one or more portions of the text content contain sensitive data, the method 400 may proceed to step 404; otherwise, the method 400 might end. This step may include processing the text content in accordance with a set of preliminary filtering rules and/or processes that correspond to the category identified in step 402. Also, this step may comprise testing the text content using a variety of different tests (e.g., regular expressions or similar rules) corresponding to different sensitive data categories (e.g., social security numbers, bank account information, personal addresses, e-mail addresses). For example, the computing device may select a plurality of characters of the first text content by identifying, by testing the first text content using a plurality of different regular expressions corresponding to a plurality of sensitive data categories, a first match between one or more characters of the plurality of characters of the first text content and a first regular expression, of the plurality of different regular expressions, corresponding to a first sensitive data category and selecting, from the first text content and based on the first match, a first predetermined quantity of characters including the one or more characters of the plurality of characters of the first text content.

To provide an example of how step 403 may be performed in practice, step 402 might identify text content to belong to user account information for a chat application, such that step 403 might involve testing the text content using a set of regular expressions that have been defined for preliminary filtering of text content in the chat application. One of those regular expressions might search for e-mail addresses, another one of those regular expressions might search for physical addresses, and yet another one of those regular expressions might search for phone numbers. Each of those regular expressions might be tested and, as will be described below, one or more matches for any of those regular expressions might cause performance of subsequent steps (such as, as will be described below, further processing of the matches using a machine learning model, algorithm, or the like). In this manner, the same text content might trigger a plurality of matches, and each of those matches might trigger a separate invocation of a machine learning model, algorithm, or the like. One of the many advantages of this approach is that multiple different instances of sensitive data in the text content received in step 401 may be handled without requiring that the text be, in advance, segmented and/or otherwise broken up for analysis (as might be required by many conventional sensitive data processing systems).

In some circumstances, the determination that the text content might relate to sensitive data might be based on one or more words and/or characters in the text content. Certain key characters, words, and/or phrases (e.g., "e-mail address," "social security number," "SSN," "password") might be strongly evocative of the presence of sensitive information, even if other rules/tests (e.g., a regular expression) do not result in a match. In turn, the preliminary filtering process described in step 403 might be implemented as a holistic test, taking into account a variety of factors (regular expression tests, word searches, metadata) that might evince the presence of some sensitive data. For example, the first match may be further based on an identification, in the first text content, of one or more words associated with the first sensitive data category. One of the many advantages of this approach is that this flexibility may increase the likelihood of potentially hidden or obscured sensitive data from being later identified.

In step 404, the computing device may identify one or more machine learning models and/or algorithms for further processing the identified portion(s) that might relate to sensitive data. Different types of sensitive data might be best processed using different approaches: for instance, one machine learning model might be best at identifying addresses (which might appear in a variety of formats), whereas one hand-programmed algorithm might be best at identifying bank account numbers (which might be in various known formats, allowing for more regimented searches based on those known formats). Moreover, the nature of the sensitive data might affect the nature of processing: extremely sensitive data might be subject to more intense processing using a slow but highly-trained machine learning model, whereas more generic sensitive data (such as an e-mail address) might be subject to processing using a more lenient and faster machine learning model. The origin of the data might matter as well: data received from a user directly might warrant more scrutiny using a more intensive machine learning model as compared to data received from a trusted organization that has likely already pre-processed the text content. In turn, when the computing device identifies a possibility of sensitive data in step 403, the nature of that sensitive data might influence the model(s) and/or algorithm(s) selected to search for that data. For example, the computing device may identify the first trained machine learning model from a plurality of trained machine learning models based on one or more of an identity of an origin of the first text content or a sensitivity level corresponding to the first sensitive data category. In some cases, the selection of a particular model might be based on pre-calculated accuracy values for a particular model (and, e.g., for a particular type of sensitive data). For example, the computing device may identify the first trained machine learning model from a plurality of trained machine learning models based on an accuracy of the first trained machine learning model. In that example, the accuracy may have been calculated based on testing the first trained machine learning model using a testing data set comprising a plurality of tagged data entries corresponding to the first sensitive data category. In this manner, the strengths of different machine learning models might be identified (e.g., a first machine learning model might be highly accurate at identifying home addresses but bad at identifying personal medical information, whereas a second machine learning model might be highly accurate at identifying personal medical information but might be terrible at identifying home addresses) and prioritized to increase true positives and minimize false negatives.

In step 405, the computing device may process the portions using the identified model(s) and/or algorithm(s). This may comprise providing a portion of the text content to an input node of a machine learning model and receiving, as output from an output node of the machine learning model, some form of response. For example, the computing device may provide, as input to a first trained machine learning model, the plurality of characters of the first text content. This processing may vary depending on the nature of the model(s) and/or algorithm(s) in question: for example, some algorithms may process portion(s) of the text content by receiving the text content as input to a particular function, whereas others might process it in batches when stored in temporary memory.

The processing performed in step 405 may comprise a greater quantity of the text content than that matched the rules and/or tests of the preliminary filter in step 403. As an example, if a regular expression found a match in text content because it found a potential match for a phone number, the characters satisfying that regular expression may be provided in conjunction with surrounding characters and/or words as input to a machine learning model and/or algorithm. In this manner, the input to the machine learning model(s) and/or algorithm(s) need not be limited to the exact characters/words/sentences that satisfied a regular expression, but might instead be more reflective of the context of those characters/words/sentences. For example, in the sentence "My name is John Smith and you can reach me at my cell at 123-456-7890 at the hours of nine to five," even though the regular expression might have identified the possibility of a phone number due to the characters "123-456-7890," all or a larger quantity of that sentence (e.g., "cell at 123-456-7890 at the") might be provided as input to an identified machine learning model. This can provide the model(s) and/or algorithm(s) additional context about the information, which might allow the model(s) and/or algorithm(s) to make a more accurate contextual identification of whether sensitive information is present.

In some implementations, even if no portion(s) are found to match in step 403, a generic set of machine learning model(s) and/or algorithm(s) might be used to process text content to identify potential sensitive data. In such a circumstance, unlike the depiction of FIG. 4, a "no" value from step 403 would result in a separate set of machine learning model(s) and/or algorithm(s) being used (e.g., a default set of machine learning model(s) and/or algorithm(s) being used). In this manner, where portion(s) of text content are identified using a preliminary filter, more accurate/tailored model(s) and/or algorithm(s) might be used; however, where no such portion(s) are identified, a more general/default set of model(s) and/or algorithm(s) might be used.

The portions might be processed using processes other than machine learning models. Some forms of information might be better processed using alternative processes. For example, the computing device may process text content using an algorithm such as a natural language processing algorithm and/or a third-party text processing algorithm. For instance, where sensitive data might be queryable in a database (e.g., a database of registered license plate numbers), then, rather than using machine learning, a possible license plate number might be used to query such a database to identify whether such a license plate number is, in fact, a license plate number for a particular user (e.g., a user associated with the text content). In this manner, specific types of sensitive information that can be more quickly validated using third-party methods might be so validated, albeit at a potential loss of speed given the potential requirement that third-party resources and/or databases should be queried to perform such validation. As another example, certain types of sensitive data might be best identified using a natural language processing algorithm that does not use machine learning. The particular choice of whether such an algorithm should be used (instead of, for example, a trained machine learning model) might be based on the accuracy of either such model with respect to the category of sensitive data. This underscores one of the many advantages of the process described herein: different types of sensitive data might be handled using entirely different model(s) and/or algorithm(s) in a manner which can (for example) prioritize accuracy and speed.

In step 406, the computing device may determine whether the processing in step 405 found sensitive data. The output of a machine learning model and/or algorithm may indicate the presence of sensitive data using a Boolean value (e.g., a "true" value reflecting the presence of sensitive data), through a list of possible candidates of sensitive data (e.g., a list of possible words in a sentence containing sensitive data and corresponding confidence values for each word), or the like. Some outputs may indicate a particular location of the sensitive data, such as a range of characters, a particular word or series of words, or the like. If such sensitive data is found, the method 400 may proceed to step 407. Otherwise, in the case where sensitive data is not found, the method 400 might end, and/or the computing device might output the data (e.g., for display) without further processing. For example, the computing device may, cause, based on output from the second trained machine learning model, display of a user interface indicating a likelihood that the second text content corresponds to at least one of the plurality of sensitive data categories.

In step 407, the computing device may process (e.g., modify) the sensitive data. This step may comprise processing the data in view of one or more rules for protecting the sensitive data, such as encrypting all or portions of the sensitive data, tokenizing all or portions of the sensitive data, removing all or portions of the sensitive data, discarding all or portions of the text content, triggering a notification and/or alarm, or the like. For example, the computing device may modify, based on output from the first trained machine learning model indicating that the plurality of characters of the first text content comprise the sensitive data of the first sensitive data category, and based on a location of the one or more characters of the plurality of characters of the first text content, at least a portion of the plurality of characters of the first text content. That first trained machine learning model may comprise an artificial neural network trained, using first training data (e.g. a first plurality of text sets tagged with indications of the sensitive data of the first sensitive data category), to identify sensitive data of the first sensitive data category. As another example, the computing device may provide, based on an absence of a second match between a plurality of characters of the second text content and the plurality of different regular expressions, and to a second trained machine learning model, the plurality of characters of the second text content. That second trained machine learning model may have been trained, using second training data, to identify sensitive data corresponding to the plurality of sensitive data categories.

Processing the sensitive data may comprise performing encryption. For example, the computing device may encrypt the at least a portion of the plurality of characters of the first text content. Encryption may be performed using one or more encryption algorithms, and might entail one-way or two-way encryption. In the case of two-way encryption, decryption of encrypted sensitive data might be performable using a particular key or similar secret.

Processing the sensitive data may comprise performing tokenization. For example, the computing device may tokenize at least a portion of the plurality of characters of the first text content. Such tokenization might be performed using a tokenization algorithm, such as one that replaces the sensitive data with a token that uniquely represents the sensitive data. As part of such tokenization, a correlation between a token and the corresponding sensitive data might be stored in a database. In such a manner, the tokenization might be reversible through de-tokenization using such a database.

Processing the sensitive data may comprise anonymizing the sensitive data. Anonymizing the sensitive data might comprise replacing it with similar but false data, such as replacing a real e-mail address with an anonymous e-mail address that forwards to the real e-mail address and/or replacing a real mailing address with a false mailing address. Such an anonymization process might comprise generating, based on a category of the sensitive data, realistic but ultimately fake data for such replacement. For instance, that fake data might be generated using a generative model, such as a generative machine learning model trained to generate realistic (but synthetic) sensitive data based on real-world sensitive data.

In step 408, the computing device may send the processed sensitive data. This process may comprise sending the processed sensitive data to some external device, such as the one or more destination devices 206 of FIG. 2. This step may comprise sending the processed sensitive data for storage, such as in a database, a data store, or the like.

In step 409, the computing device may determine whether it should reverse the processing performed in step 407. In some circumstances, one or more devices (such as the one or more destination devices 206 of FIG. 2) might request access to sensitive data. In such a circumstance, if the request is legitimate (and, e.g., authenticated using authentication credentials of the requesting device), then the computing device might reverse the processing. If such a request is received (and, e.g., authenticated and otherwise legitimate), the method 400 may proceed to step 410. Otherwise, the method 400 may end.

In step 410, the computing device may reverse the processing performed in step 407. Such reversal of processing might comprise sending the sensitive data directly to the requesting device, such as in response to a request comprising a particular token. Such reversal of processing might additionally and/or alternatively comprise receiving the text content from the requesting device and de-encrypting one or more encrypted portions of the text content using a de-encryption algorithm.

Figure 5:
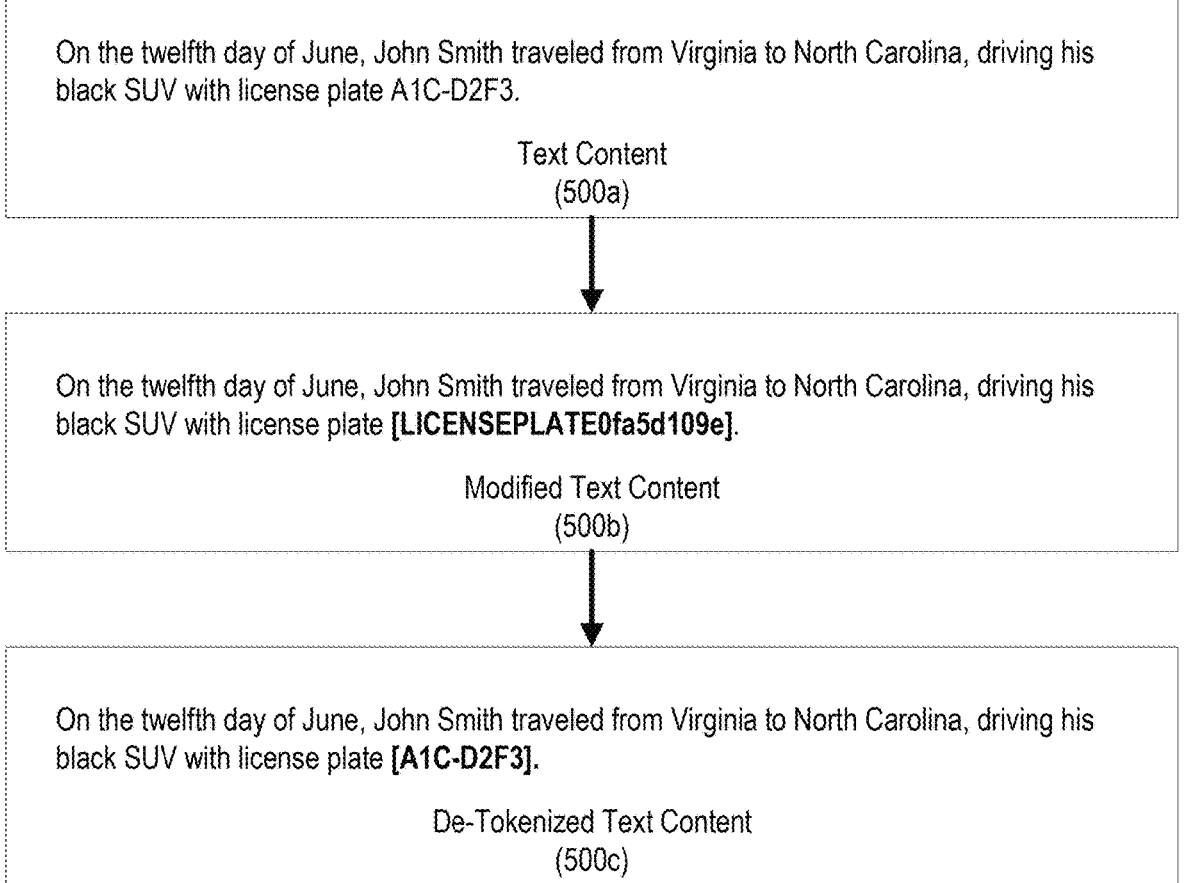
FIG. 5 depicts text content, modified text content, and de-tokenized text content.

FIG. 5 depicts an example of text content 500*a*, modified text content 500*b*, and de-tokenized text content 500*c*. Here, the text content 500*a* is simplified, showing a single sentence. In this context, after processing in accordance with step 401 through step 408 of FIG. 4, the modified text content 500*b* might have been generated. The modified text content 500*b*, relative to the text content 500*a*, shows that the license plate value "A1C-D2F3" has been replaced with a token. Then, in accordance with step 409 and step 410 of FIG. 4, the computing device might later generate the de-tokenized text content 500*c*, showing that the license plate value has been re-inserted back into the text content 500*a*.

FIG. 6 depicts an example of text content 600*a* and encrypted text content 600*b*. This figure illustrates how sensitive content (here, by way of illustration, a license plate, "A1C-D2F3") in a single sentence of the text content 600*a* is encrypted into an encrypted value "b1c262d468ae7da9112d6aeb58780e2c" as part of the encrypted text content 600*b*. In this context, the encrypted content might be salted and hashed and/or otherwise processed in a one-way encryption process such that is designed to prevent decryption back to the original value. Such a process may be taken where, for example, the original value of the sensitive content (e.g., the license plate) is not necessary (e.g., because the sentence in the text content 600*a* is being used for machine learning model training, such that the exact value of a license plate is not particularly important for that training). As an alternative to and/or in addition to such encryption, other forms of processing might be performed to effectively limit access to the sensitive data. For example, the sensitive data could be deleted (e.g., "with license plate"), and/or an algorithm could be used to replace the sensitive data with synthetic content (e.g., "with license plate ABC-DEFG"). The synthetic content might be generated using an algorithm (e.g., a particularized fake license plate generation algorithm) and/or using a machine learning model, such as a large language model (e.g., by asking the large language model to provide an example of a fake license plate).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A first computing device comprising:
   one or more processors; and
   memory storing instructions that, when executed by the one or more processors, cause the first computing device to:
   receive, from a second computing device, text content;
   test each of a plurality of different portions of the text content for sensitive data;
   based on a determination that a first portion of the plurality of different portions of the text content comprises first sensitive data:
   determine a sensitive data category of the first sensitive data;
   provide, based on the sensitive data category of the first sensitive data and as input to a first trained machine learning model, a first plurality of characters of the first portion of the plurality of different portions of the text content; and
   generate, based on output from the first trained machine learning model, a first token;
   based on a determination that a second portion of the plurality of different portions of the text content comprises second sensitive data:
   determine a sensitive data category of the second sensitive data; and
   generate, based on the sensitive data category of the second sensitive data, a second token by processing a second plurality of characters of the second portion of the plurality of different portions of the text content using a tokenization algorithm;
   generate a tokenized version of the text content by:
   replacing the first portion of the plurality of different portions of the text content with the first token; and
   replacing the second portion of the plurality of different portions of the text content with the second token;
   receive, from a third computing device, a request for the text content; and
   send, to the third computing device and in response to the request, the tokenized version of the text content.

2. The first computing device of claim 1, wherein the instructions, when executed, further cause the first computing device to:
   identify the first trained machine learning model from a plurality of trained machine learning models based on the sensitive data category of the first sensitive data.

3. The first computing device of claim 1, wherein the instructions, when executed, further cause the first computing device to generate the second token by encrypting at least a portion of the second plurality of characters.

4. The first computing device of claim 1, wherein the instructions, when executed, further cause the first computing device to test each of the plurality of different portions of the text content for sensitive data by comparing at least a portion of the text content to a regular expression.

5. The first computing device of claim 1, wherein the determination that a first portion of the plurality of different portions of the text content comprises first sensitive data is based on an identification, in the first portion, of one or more words associated with the sensitive data category of the first sensitive data.

6. The first computing device of claim 1, wherein the instructions, when executed, further cause the first computing device to:

receive, from the third computing device, a request for an original form of the text content; and send, based on authenticating the third computing device, the text content to the third computing device.

7. The first computing device of claim 1, wherein the instructions, when executed, further cause the first computing device to generate the second token based on a format of the second plurality of characters.

8. A method comprising:

receiving, by a first computing device and from a second computing device, text content;

testing each of a plurality of different portions of the text content for sensitive data;

based on a determination that a first portion of the plurality of different portions of the text content comprises first sensitive data:

determining a sensitive data category of the first sensitive data;

providing, based on the sensitive data category of the first sensitive data and as input to a first trained machine learning model, a first plurality of characters of the first portion of the plurality of different portions of the text content; and generating, based on output from the first trained machine learning model, a first token;

based on a determination that a second portion of the plurality of different portions of the text content comprises second sensitive data:

determining a sensitive data category of the second sensitive data; and generating, based on the sensitive data category of the second sensitive data, a second token by processing a second plurality of characters of the second portion of the plurality of different portions of the text content using a tokenization algorithm;

generating a tokenized version of the text content by:

replacing the first portion of the plurality of different portions of the text content with the first token; and replacing the second portion of the plurality of different portions of the text content with the second token;

receiving, from a third computing device, a request for the text content; and sending, to the third computing device and in response to the request, the tokenized version of the text content.

9. The method of claim 8, further comprising:

identify the first trained machine learning model from a plurality of trained machine learning models based on the sensitive data category of the first sensitive data.

10. The method of claim 8, wherein the generating the second token comprises encrypting at least a portion of the second plurality of characters.

11. The method of claim 8, wherein the testing each of the plurality of different portions of the text content for sensitive data comprises comparing at least a portion of the text content to a regular expression.

12. The method of claim 8, wherein the determination that a first portion of the plurality of different portions of the text content comprises first sensitive data is based on an identification, in the first portion, of one or more words associated with the sensitive data category of the first sensitive data.

13. The method of claim 8, further comprising:

receiving, from the third computing device, a request for an original form of the text content; and sending, based on authenticating the third computing device, the text content to the third computing device.

14. The method of claim 8, wherein the generating the second token is based on a format of the second plurality of characters.

15. One or more non-transitory computer-readable media storing instructions that, when executed by one or more processors of a first computing device, cause the first computing device to:

receive, from a second computing device, text content;

test each of a plurality of different portions of the text content for sensitive data;

based on a determination that a first portion of the plurality of different portions of the text content comprises first sensitive data:

determine a sensitive data category of the first sensitive data;

provide, based on the sensitive data category of the first sensitive data and as input to a first trained machine learning model, a first plurality of characters of the first portion of the plurality of different portions of the text content; and generate, based on output from the first trained machine learning model, a first token;

based on a determination that a second portion of the plurality of different portions of the text content comprises second sensitive data:

determine a sensitive data category of the second sensitive data; and generate, based on the sensitive data category of the second sensitive data, a second token by processing a second plurality of characters of the second portion of the plurality of different portions of the text content using a tokenization algorithm;

generate a tokenized version of the text content by:

replacing the first portion of the plurality of different portions of the text content with the first token; and replacing the second portion of the plurality of different portions of the text content with the second token;

receive, from a third computing device, a request for the text content; and send, to the third computing device and in response to the request, the tokenized version of the text content.

16. The one or more non-transitory computer-readable media of claim 15, wherein the instructions, when executed, further cause the first computing device to:

identify the first trained machine learning model from a plurality of trained machine learning models based on the sensitive data category of the first sensitive data.

17. The one or more non-transitory computer-readable media of claim 15, wherein the instructions, when executed, further cause the first computing device to generate the second token by encrypting at least a portion of the second plurality of characters.

18. The one or more non-transitory computer-readable media of claim 15, wherein the instructions, when executed, further cause the first computing device to test each of the plurality of different portions of the text content for sensitive data by comparing at least a portion of the text content to a regular expression.

19. The one or more non-transitory computer-readable media of claim 15, wherein the determination that a first portion of the plurality of different portions of the text content comprises first sensitive data is based on an identification, in the first portion, of one or more words associated with the sensitive data category of the first sensitive data.

20. The one or more non-transitory computer-readable media of claim 15, wherein the instructions, when executed, further cause the first computing device to:

receive, from the third computing device, a request for an original form of the text content; and send, based on authenticating the third computing device, the text content to the third computing device.

\*　\*　\*　\*　\*